United States Patent [19]

Harrison

[11] Patent Number: 4,992,001
[45] Date of Patent: Feb. 12, 1991

[54] METHOD OF DEEPWATER PIPELAY

[75] Inventor: Gary E. Harrison, Katy, Tex.

[73] Assignee: McDermott International, Inc., New Orleans, La.

[21] Appl. No.: 570,172

[22] Filed: Aug. 17, 1990

[51] Int. Cl.⁵ .............................................. F16L 1/16
[52] U.S. Cl. .................................... 405/166; 405/168
[58] Field of Search ............... 405/158, 166, 168, 169, 405/170

[56] References Cited

U.S. PATENT DOCUMENTS

| | | | |
|---|---|---|---|
| 3,641,778 | 2/1972 | Gibson | 405/168 |
| 3,715,890 | 2/1973 | Langner | 405/166 |
| 3,822,559 | 7/1974 | Matthews | 405/166 |
| 4,433,938 | 2/1984 | Boon | 405/166 |

Primary Examiner—David H. Corbin
Attorney, Agent, or Firm—Robert J. Edwards; Michael L. Hoelter

[57] ABSTRACT

A method of laying pipeline in water greater than 1000 feet deep is disclosed whereby the pipeline is assembled on board a lay barge and then, during deployment, is bent beyond typical elastic bending limitations and Conventional Lay bending strain limitations while passing along a stinger where it is subsequently reverse bent to remove any permanent curvature. Upon further deployment, a generally horizontal axial load is maintained on the pipeline as it come to rest upon the sea floor such that the final in-situ residual bending curvature of the pipeline is nearly zero or falls within an acceptable range.

8 Claims, 4 Drawing Sheets

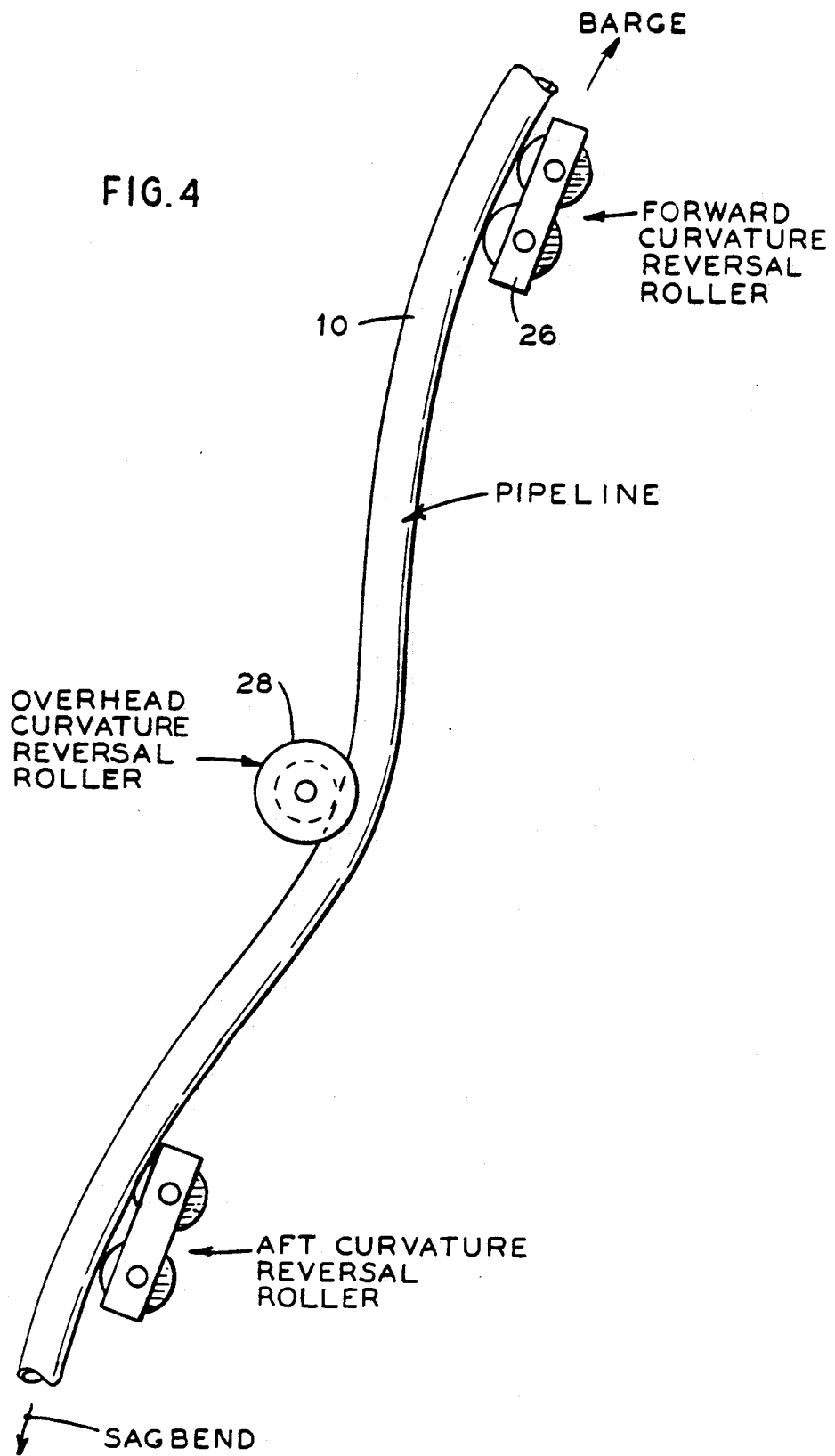

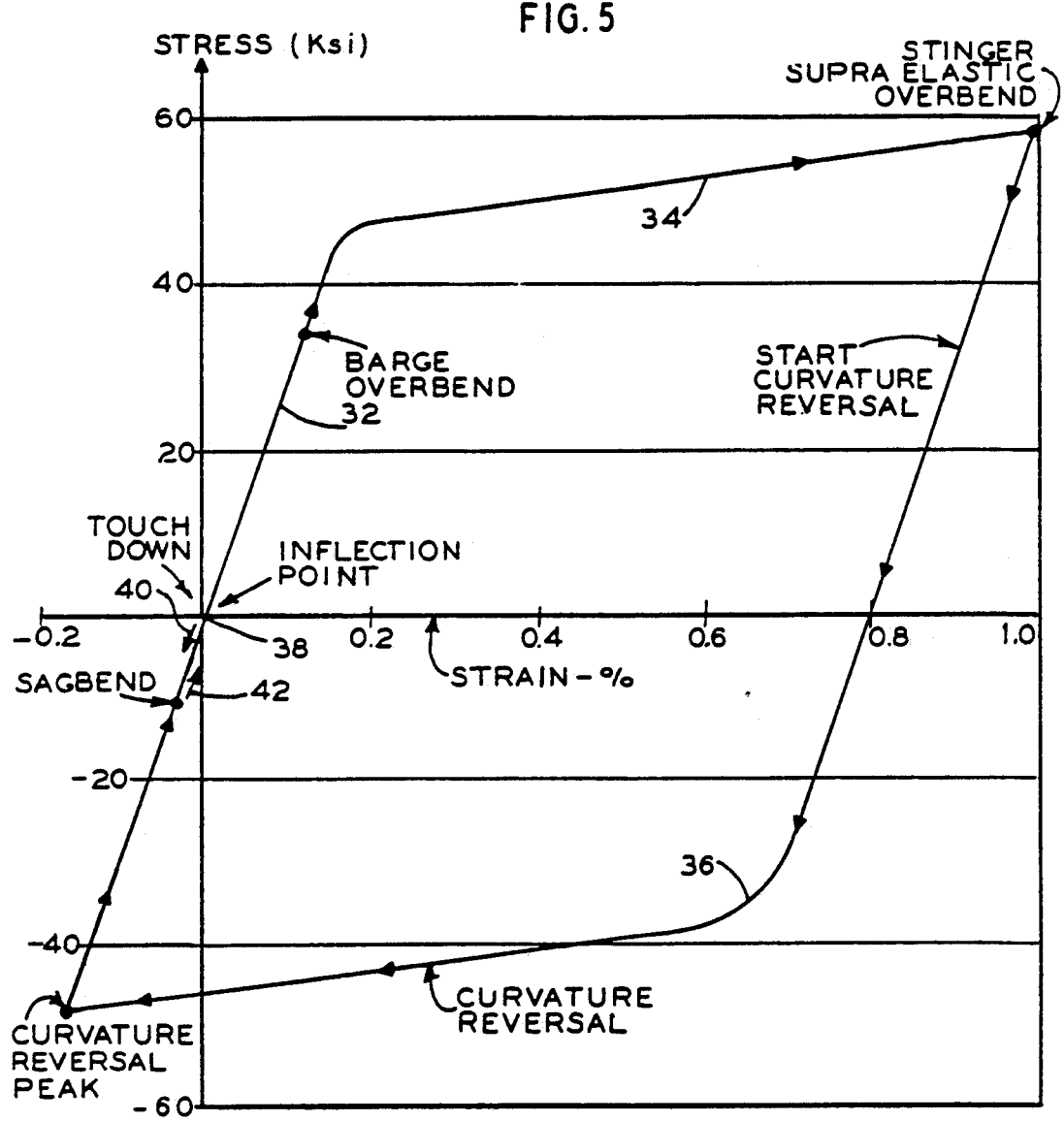

METHOD OF DEEPWATER PIPELAY

FIELD OF THE INVENTION

This invention pertains to laying pipe in a marine environment and more particularly to a deepwater (i.e., greater than 1000 feet) pipelaying method utilizing the Conventional Lay technique and machinery.

BACKGROUND OF THE INVENTION

There are basically three methods of laying pipe in a marine environment: Conventional Lay, Reel-Lay, and J-Lay.

In Conventional Lay, the pipeline is horizontally fabricated on board the vessel by adding individual lengths to the pipeline as it progresses along the deck of the vessel. Near the stern, the assembled pipeline moves along a stinger to begin its descent to the seafloor. The change from a horizontal orientation along the deck of the vessel to a vertical orientation during its descent (overbend) and then its return to a horizontal orientation along the sea floor (sagbend) create strains in the pipe which must not damage the structural integrity of the pipeline. Strains in these regions are typically limited by specification to bending strains in the range of from 0.15 to 0.35 percent with the lower end of this range representing approximately the limit of elastic bending behavior.

The reasons for such bending strain limitations are (1) to prevent the pipeline from bending collapse and (2) to avoid excessive, permanent "residual curvature" from occurring when elastic bending limits are exceeded. For all but the largest diameter pipelines (30-inch and larger) the primary purpose of the above bending strain limitations is to avoid excessive residual curvature. Should these bending strains be exceeded, then the resulting residual curvature must be corrected or reduced to acceptable limits.

As water depth increased, the normal manner of coping with these bending strain limitations was to increase the stinger support length for the overbend region and to apply horizontal axial tension to the pipeline for the sagbend region. Such horizontal tension was created by utilizing the vessel's mooring/anchoring system to "pull" on the pipeline, while the pipeline is coupled to the lay vessel with a gripping device or pipeline tensioner. Alternatively, vessel thrusters were utilized to supply the required horizontal force but the practical and economic aspects of creating and maintaining the necessary thruster forces quickly become prohibitive as water depth increases.

In the Reel-Lay technique, the to-be-laid pipeline is unwound from a reel as the vessel progresses. By initially winding the pipeline in such a manner, the elastic bending strain limitations are greatly exceeded thereby requiring the pipeline to be "straightened" before it can be laid. This is accomplished by reverse bending the pipeline as it moves along the stinger so as to achieve an acceptable in-situ residual curvature. The Reel-Lay technique also employs the application of axial tension to the pipeline as in the Conventional Lay technique to maintain appropriate bending strains after straightening has occurred. By utilizing residual curvature limitations rather than the more conservative bending strain limitations, Reel-Lay achieves pipeline installation with significantly reduced axial tension requirements and stinger support lengths.

In J-Lay, the pipeline is dispatched from the vessel in a vertical orientation rather than from a horizontal orientation as in Conventional Lay and Reel-Lay. Thus, the J-Lay provides for only one vertically oriented work station as compared to the multiple horizontal work stations available with the Conventional Lay technique.

It is thus an object of this invention to apply the bending limitations used in the Reel-Lay technique to the Conventional Lay operation so as to achieve a significantly increased water depth capability for the Conventional Lay technique. Another object of this invention is to provide a method whereby larger diameter pipelines (i.e., greater than 12") can be laid with this method than is currently possible with the Reel-Lay technique or is currently feasible with the Conventional Lay technique. Further objects of this invention are to reduce the stinger length normally required under the Conventional Lay technique and to reduce the amount of horizontal tension that must be applied to the pipeline. These and other objects of this invention will become obvious upon further investigation,

SUMMARY OF THE INVENTION

This invention pertains to a method of laying a pipeline in deep water (i.e., greater than 1000 feet). More specifically, it involves the steps of assembling the pipeline on board a lay barge and then deploying the assembled pipeline along a stinger where it is intentionally bent to a degree exceeding the normal bending strain limitation of approximately 0.15 to 0.35 percent (the exact value being dependent on water depth and the physical characteristics of the pipeline). Afterwards, the pipeline is reverse bent to a degree that removes the previous inelastic bending to result in an acceptable residual bending strain value (less than 0.2%).

BRIEF DESCRIPTION OF THE DRAWINGS

FIG. 4 is a pictorial view of the stinger required in accordance with the new method described herein.

FIG. 5 is a stress-strain plot of the pipeline laid in accordance with the new procedure described herein.

DETAILED DESCRIPTION OF THE DRAWINGS

Figure 1:
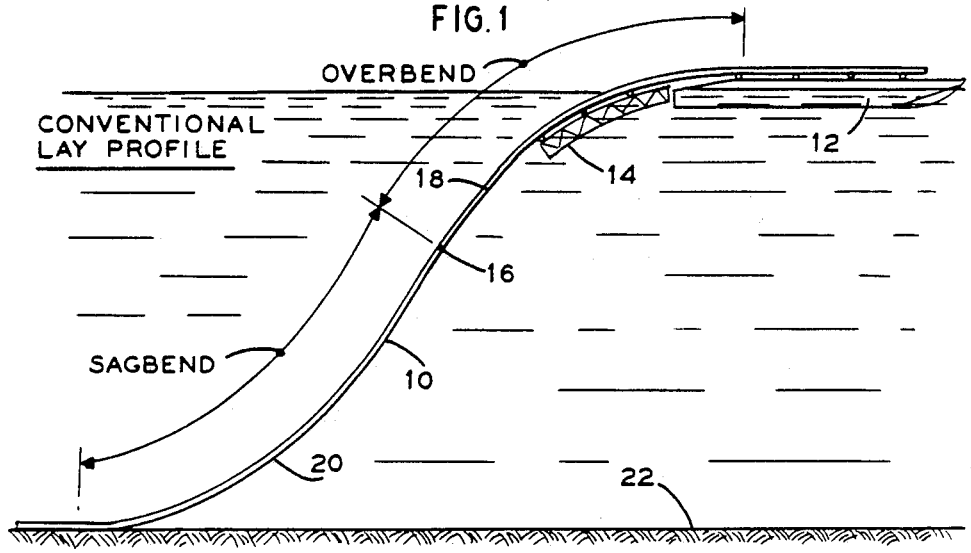
FIG. 1 is a pictorial view of the Conventional Lay technique for laying a pipeline in a marine environment.

Referring initially to FIG. 1, there is shown the Conventional Lay technique or method of laying a pipeline in a marine environment. As disclosed, pipeline 10 is assembled from a multitude of individual lengths on lay barge 12. Generally, pipeline 10 is assembled by joining lengths of straight pipe at the bow of lay barge 12 and progressively completing the field weld/joint at work stations further aft along lay barge 12. Upon final assembly, pipeline 10 is slid over stinger 14 by the forward movement of lay barge 12. The "overbend" of pipeline 10 occurs as this pipeline changes from a horizontal orientation on lay barge 12 to a more vertical orientation along and past stinger 14.

Partway along the descent of pipeline 10, and as a result of the "S" shaped bend through which it will travel, the bending strain in pipeline 10 reaches a minimum value (approximately zero) at a location identified as inflection point 16. This point normally marks the end of overbend region 18 of pipeline 10 and the beginning of sagbend region 20. Sagbend region 20 is that region where pipeline 10 changes from a generally vertical orientation as it descends toward sea bed 22 to a more horizontal orientation along sea bed 22.

In the Conventional Lay method, the maximum allowable bending strains are limited by the given specification for the job, the water depth, and the physical characteristics of 15 pipeline 10. Normally, such bending strain limits are in the order of 0.15 to 0.35 percent with the lower range representing the limit of elastic bending behavior. To control the bending strain in the overbend region 18, stinger 14 is used to limit the amount of curvature that is possible. In sagbend region 20, the bending strain is controlled by the application of axial tension to pipeline 10. This application of a predominately horizontal force is accomplished by either "pulling" on the mooring lines or is accomplished dynamically by vessel thrusters.

In shallower water depths (i.e., less than 1000 feet), the Conventional Lay vessel uses anchor mooring to maintain position control during pipelaying operations. However, as water depth increases, the limit of such anchor mooring systems is eventually reached. Consequently, for deepwater pipelaying (i.e., typically greater than 1000 feet), the preferred method is the utilization of a dynamic mooring system, which involves the use of vessel thrusters, to maintain lay barge 12 in position. Unfortunately, the creation and maintenance of the large horizontal forces needed from such dynamic mooring systems makes their use economically and oftentimes practically prohibitive.

The reasons for limiting the bending strains in the Conventional Lay method are (1) to maintain an adequate margin of safety from bending collapse, and (2) to avoid excessive in-situ "residual curvature" due to permanent bending deformation when the elastic bending strain limits are exceeded. For larger diameter pipelines, 30" diameter and greater, the specified bending limitation is due to bending collapse, but for smaller diameter pipelines, under 30" in diameter, the primary purpose of the bending strain limitation is to avoid excessive residual curvature from occurring. Should such bending strain limitation be exceeded for smaller diameter pipelines, then the resulting residual curvature must be counterbent within the acceptable limits. A typical limit of in-situ residual bending curvature is 0.004/D where D is pipeline outside diameter. This limit is usually expressed as a residual bending strain of 0.20%.

Figure 2:
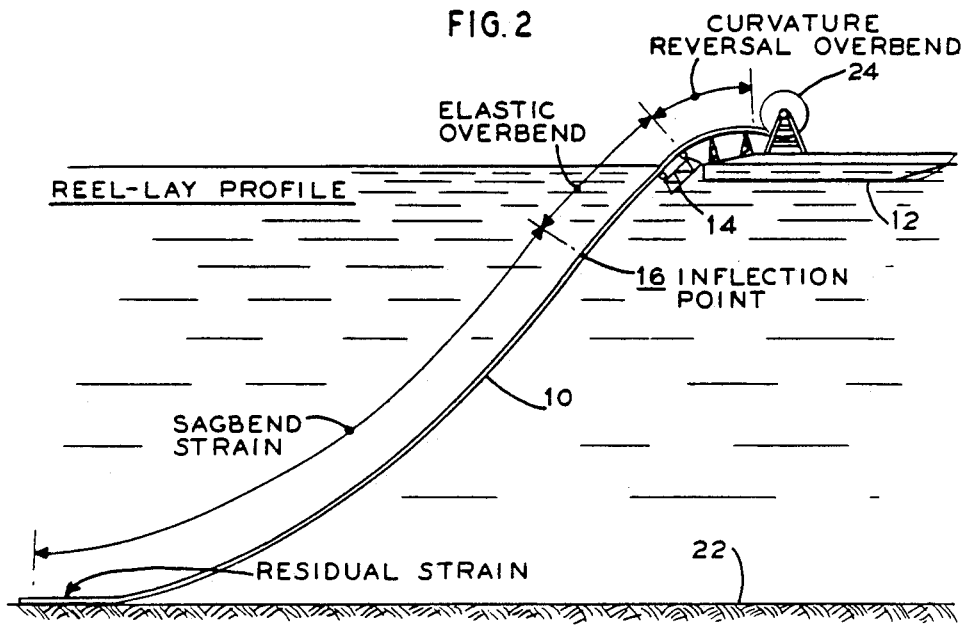
FIG. 2 is a pictorial view of the Reel-Lay technique for laying a pipeline in a marine environment.

Referring now to FIG. 2, there is shown the Reel-Lay method of installing marine pipelines 10. As can be seen, prior to deployment, pipeline 10 is wound around reel 24 which causes the elastic bending strain limits referred to above to be greatly exceeded. However, just prior to deployment, and while passing over stinger 14, pipeline 10 is straightened to reduce the in-situ residual curvature to acceptable limits. (When pipeline 10 is wound around reel 24, the imposed bending strain ranges from about 0.6 to 2.0 percent depending on pipeline and reel diameter). The Reel-Lay method also requires the application of a horizontal axial force to pipeline 10 to counter the sagbend of pipeline 10, but, by employing residual curvature limits on a "straightened" pipe rather than attempting to always stay within elastic bending strain limits, the Reel-Lay technique requires a significantly reduced horizontal axial force and stinger support length as compared to the Conventional Lay technique.

Figure 3:
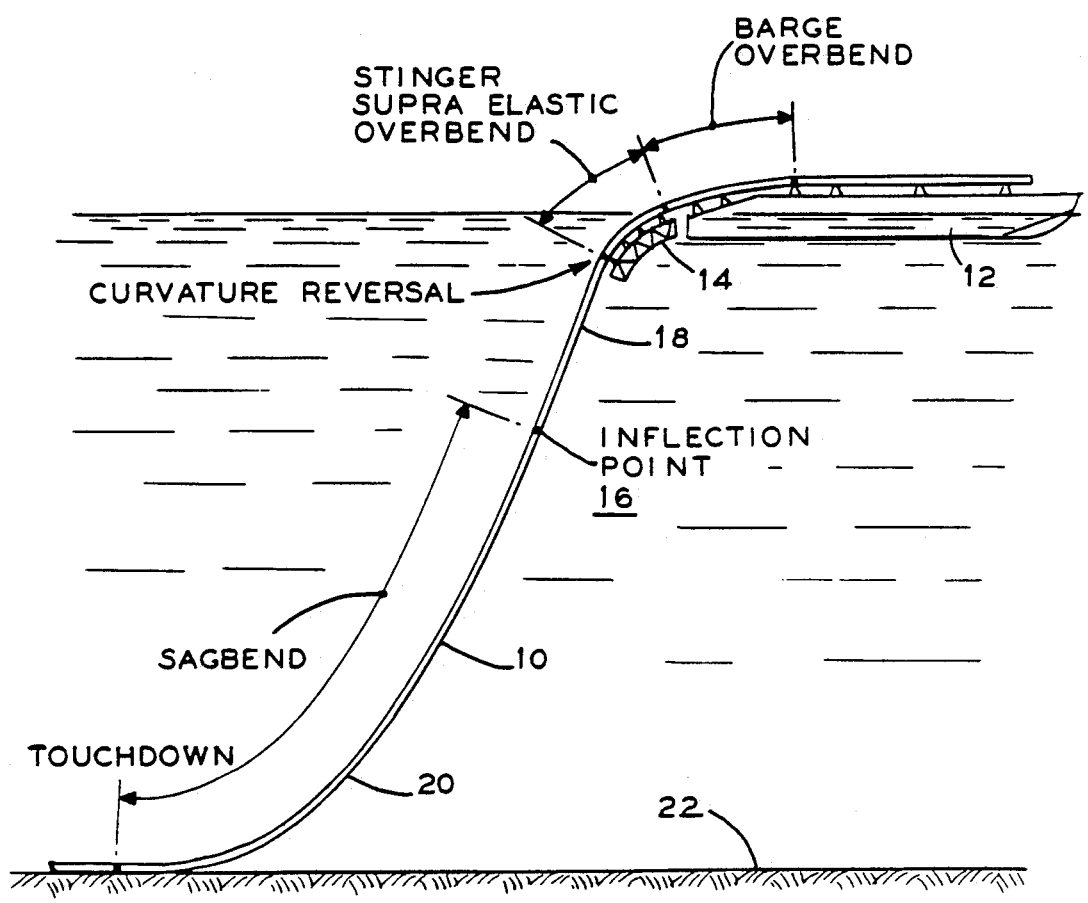
FIG. 3 is a pictorial view of the new method of pipelaying described herein.

As a result, this invention, as depicted in FIG. 3, applies the bending limitation found in the Reel-Lay technique to Conventional Lay operations to achieve a greatly increased water depth capability for the Conventional Lay method. It is not widely recognized or appreciated that the bending strain limits applied to Conventional Lay are inconsistent with Reel-Lay limitations. Thus, it had always been thought that Conventional Lay equipment, which constitutes the bulk of the construction industry's available equipment, was precluded from providing pipelaying services for deepwater (i.e., greater than 1000') pipelines. This was because of the tremendous axial forces and long stinger lengths previously thought required for Conventional Lay due to the rigid adherence to elastic bending strain limitations rather than to residual curvature limitations.

Referring now to FIG. 3, there is shown this new method of laying pipeline. Referred to as SupreElastic Lay, it combines the equipment and ease of construction and operation found in Conventional Lay techniques with the residual curvature limitations found in Reel-lay techniques. In so doing, the use of vessel thrusters to supply the required horizontal force now becomes both practical and economical for deep water pipeline construction.

SupraElastic Lay replaces traditional bending strain limitations with a combined limitation of Minimum Overbend Radius/Collapse Radius Ratio (MOCR) and Maximum Residual Strain (MRS). A value of 2.0 is proposed as a limiting MOCR while a value of 0.10 percent is proposed for MRS. These values are conservative and are consistent with criteria applied to Reel-Lay operations.

As shown in FIG. 3, pipeline 10 is constructed and/or assembled in a variety of work areas along lay barge 12 just as in the Conventional Lay technique. Once assembled, pipeline 10 passes to stinger 14 thereby imposing a barge overbend (bending strain of about 0.12%) to pipeline 10. The shortened length of stinger 14 made possible by SupraElastic Lay also contributes to the overbend of pipeline 10 (stinger SupraElastic overbend has a bending strain of about 1.0%). At this point, pipeline 10 will have a convex bend applied to it which shall be defined as a positive bend. To counter this positive overbend, stinger 14 "straightens" pipeline 10 by a series of curvature reversal rollers. FIG. 4 illustrates such rollers and identifies them more accurately as forward curvature reversal roller 26, overhead curvature reversal roller 28, and aft curvature reversal roller 30. The combination of these curvature reversal rollers results in a negative bending strain of −0.17%. This negative value (or concave bend) reverses or straightens the positive bending imposed by the the inelastic overbend bending previously imposed on pipeline 10.

As pipeline 10 progresses towards sea floor 22, inflection point 16 is reached at 0% strain. Inflection point 16 also marks the beginning of sagbend region 20. In this embodiment, the bending strain imposed by sagbend on pipeline 10 is an elastic bending strain of about −0.03% (concave curvature). Afterwhich, at touchdown and due to the horizontal forces applied to it, pipeline 10 relaxes on seafloor 22 to. a near zero residual bending strain and consequently a near zero residual bending curvature level or, at the least, values which fall within an acceptable range.

To better illustrate the advantage of SupreElastic Lay over Conventional Lay, the following comparison is presented. In a case involving a 12.75 inch O.D. ×0.638 inch WT pipeline, Steel Grade API-5L-X52 coated with 15 mils of fusion bonded epoxy and installed over a water depth of from 1000 feet to 7000 feet, the following is a summary of the results:

|  | Conventional Lay | SupraElastic Lay |
| --- | --- | --- |
| Barge Tension Range (kips) | 45-330 | 36-183 |
| Stinger Length (feet) | 322 | 75 |
| Resultant Horizontal Mooring Force Range (kips) | 18-175 | 8-25 |

As can be seen from the above, application of SupreElastic Lay installation criteria achieves a significant reduction in stinger length and horizontal mooring load requirements. The reduction of this mooring load is of great importance because if makes feasible the utilization of dynamic mooring (vessel thrusters) for lay barge 12 as compared with anchor mooring as used in the past. (Dynamic mooring is the preferred method for deepwater pipeline construction but until now, such mooring was economically prohibitive due to the large forces that were required using Conventional Lay technique in such deep water projects.) Additionally, the reduced stinger length associated with SupreElastic Lay increases the feasibility of man pipeline projects in deeper water depths.

In general, the mooring force required for SupraElastic Lay is only 10 to 50 percent of that required for traditional Convention Lay operations. SupreElastic Lay also makes practical the continued use of existing pipelaying equipment which otherwise would be precluded from deep water projects.

Finally, SupreElastic Lay is more attractive than J-Lay in that SupreElastic Lay has multiple horizontal work stations on lay barge 12 to complete field joints as compared with the single near-vertical work station associated with J-Lay techniques. Also, SupreElastic Lay is attractive over Reel-Lay due to the increased capacity for laying pipelines of larger diameter (i.e., greater than 12 inches) which had previously been precluded under traditional Reel-Lay operations (bending collapse would occur due to the excessive bending of such large pipe about a reel).

FIG. 5 is typical bending stress-strain plot with the path of barge overbend 32 (positive/convex), stinger SupreElastic overbend 34 (positive/convex), curvature reversal 36 (negative/concave), inflection point 38 (no bend), sagbend 40 (negative/concave), and touchdown 42 (no bend) being shown.

What is Claimed as Invention is:

1. A method of deepwater pipelaying comprising the steps of:
    (a) assembling a straight pipeline on a lay barge in a marine environment;
    (b) deploying said pipeline from said lay barge along a stinger;
    (c) overbending said straight pipeline along said stinger to bending strains exceeding normal Conventional Lay bending strain limitations of approximately 0.15 to 0.35 percent;
    (d) reverse bending said pipeline before leaving said stinger to a pre-determined negative or reverse curvature resulting in a bending strain of opposite sign at that point along said pipeline; and,
    (e) applying a generally horizontal axial force to said pipeline to control said bending strain as said pipeline is deployed to and engages the ocean floor thereby resulting in a final, at rest, in-situ residual bending strain value within acceptable limits.

2. The method as set forth in claim 1 further comprising the step of reverse bending said pipeline by application of a series of reverse curvature rollers secured to said stinger.

3. The method as set forth in claim 2 further comprising the step of reverse bending said pipeline by passing it over a forward curvature reverse roller then under an overhead curvature reverse roller and then over an aft curvature reverse roller.

4. The method as set forth in claim 3 further comprising the step of deploying said pipeline to a depth of at least 1000 feet below the waterline.

5. The method as set forth in claim 4 further comprising the step of bending said straight pipe beyond the elastic bending behavior limit of about 0.15 percent.

6. The method as set forth in claim 5 further comprising the step of assembling said straight pipe by adding single joints at the bow of said lay barge and progressively completing the field weld/joint at work stations further aft along said lay barge.

7. The method as set forth in claim 6 further comprising the step of applying a generally horizontal axial force to said pipeline by lay vessel dynamic mooring means, said means comprising vessel thrusters to maintain tension on said pipeline, which is still attached to the lay vessel.

8. The method as set forth in claim 6 further comprising the step of applying a generally horizontal axial force to said pipeline by lay vessel anchor line mooring means, said means comprising at least one anchor line for pulling purposes thereby creating tension in said pipeline, which is still attached to said lay vessel.

* * * * *